United States Patent [19]

Kakumaru et al.

[11] 4,312,916
[45] Jan. 26, 1982

[54] PROCESS FOR PRODUCING ADHESIVE FILM

[75] Inventors: Hajime Kakumaru; Nobuyuki Hayashi; Toshiaki Ishimaru, all of Hitachi; Kiyoshi Nakao, Yuuki; Tomohisa Ohta, Shimodate, all of Japan

[73] Assignee: Hitachi Chemical Company, Ltd., Tokyo, Japan

[21] Appl. No.: 186,240

[22] Filed: Sep. 11, 1980

[30] Foreign Application Priority Data

Sep. 11, 1979 [JP] Japan .................................. 54-11694

[51] Int. Cl.$^3$ ............................................. B05D 3/06
[52] U.S. Cl. ................................ 428/345; 204/159.16; 427/54.1; 427/207.1; 427/208.4; 427/53.1; 428/355
[58] Field of Search ................... 427/44, 54.1, 53.1, 427/207.1, 208.4; 204/159.16; 428/345, 355

[56] References Cited

U.S. PATENT DOCUMENTS 3,617,361 11/1971 Reinhard et al. ................. 427/208.4
4,074,004 2/1978 Bateson et al. .................... 427/207.1
4,152,189 5/1979 Guerin et al. ..................... 427/208.4

Primary Examiner—John H. Newsome
Attorney, Agent, or Firm—Craig and Antonelli

[57] ABSTRACT

A process for producing adhesive film comprising coating on a filmlike substrate a composition comprising (i) a copolymer having a glass transition temperature of −30° C. or lower and obtained from one or more monomers (a) such as alkyl acrylates or methacrylates, or the like, and another monomers (b) containing at least one carboxyl, alcoholic hydroxyl, or glycidyl group, (ii) a crosslinking agent having at least two crosslinkable functional groups which can react with the monomers (b), (iii) one or more monofunctional addition polymerizable monomers having a boiling point of 200° C. or higher, (iv) one or more polyfunctional addition polymerizable monomers having a boiling point of 200° C. or higher, and (v) a photochemical initiator, and irradiating said composition with actinic light, is advantageous in that the amount of solvent to be removed after coating the composition on the substrate can be reduced remarkably without lowering properties of the resulting adhesive film.

7 Claims, No Drawings

PROCESS FOR PRODUCING ADHESIVE FILM

BACKGROUND OF THE INVENTION

This invention relates to a process for producing adhesive film, more particularly, to a process for producing adhesive film by irradiation of actinic light.

Heretofore, adhesive film has been produced by dissolving a high polymer having reactive groups with a crosslinking agent and a crosslinking agent in a large amount of solvent, coating the resulting solution on a film substrate, removing the large amount of solvent with heating and at the same time crosslinking the adhesive composition. The viscosity of the coating solution is generally from several ten centipoises to several thousand centipoises. As the high polymer which is a matrix of adhesive material, it is preferable to use a high polymer having a higher molecular weight, usually a molecular weight of several hundred thousands, considering properties of the adhesive film as mentioned hereinafter. Therefore, in order to make the viscosity of the coating solution suitable for coating, the amount of the solvent to be used amounts to 70 to 90% by weight.

Thus, it has been a great problem to evaporate and scatter such a large amount of solvent at the time of heating from the viewpoints of saving resources and air pollution. In order to solve such a problem, it has been proposed to recover scattered solvent at the time of heating and partly practiced, but the recovering cost is very large and the recovering yield is not sufficient. On the other hand, in order to lessen the amount of the solvent to be evaporated and scattered, it is thinkable to reduce the amount of the solvent in the adhesive composition before coating. But when the molecular weight of the high polymer which is a matrix of adhesive material is several hundred thousands or more, the viscosity of the coating solution is increased by reducing the amount of the solvent, which makes coating process difficult. Therefore, the amount of the solvent can be reduced to 60 to 80% by weight at most.

In order to reduce the amount of the solvent and to lower the viscosity of the coating solution, the molecular weight of the high polymer which is a matrix of adhesive material should be lowered. But when the molecular weight is lowered, internal cohesion strength of the resulting adhesive film is lowered, which results in easily bringing about migration to an adherend at the time of peeling off the adhesive film after the application of the adhesive film for a long period of time. On the other hand, when crosslinking density is enhanced in order to prevent the migration and to supplement the cohesion strength of the adhesive material itself, the glass transition temperature is increased so as to lower adhesiveness.

As mentioned above, there is a limitation in reducing the amount of solvent to be used in conventional processes for producing adhesive composition and adhesive film from the viewpoints of coating processability and physical properties.

On the other hand, there is disclosed in Dutch Pat. No. 6,601,711 a process for producing an adhesive material without using a solvent. According to this process, a monomer (acrylate monomer) which becomes a polymer used as a mattrix of the adhesive material is coated on a filmlike substrate and polymerized on the substrate by irradiation of ultraviolet light. This process is advantageous in that no solvent is used for producing the polymer as a matrix of the adhesive material. But according to experiments of the present inventors, there are many defects in that the kind of monomers used for producing the polymer which is a matrix of the adhesive material is limited, these monomers are easily evaporated and scattered at the time of irradiation of ultraviolet light and quantum yield by the photochemical reaction is very low. Consequently, there arise many problems such as pollution of the working circumstances by the evaporation and scattering of the monomer, pollution of the apparatus such as a lamp by the adhesion and curing of the monomer evaporated and scattered, migration of unreacted monomer remaining in the produced film to an adherend, and the like. When a monomer hardly evaporating and scattering and having low volatility is used or cured material obtained from a monomer having a high quantum yield is used, it is very difficult to obtain sufficient adhesiveness.

The present inventors have studied to solve the problems mentioned above and accomplished this invention.

SUMMARY OF THE INVENTION

It is an object of this invention to solve various problems caused by evaporation and scattering of a large amount of solvent contained in an adhesive composition. It is another object of this invention to provide a process for producing adhesive film by using a composition containing no solvent or a remarkably small amount of solvent compared with conventional ones, if a solvent is contained, and having a viscosity suitable for coating without lowering physical properties of the resulting adhesive film unlike the conventional coating composition.

This invention provides a process for producing adhesive film which comprises coating on a filmlike substrate a composition comprising (i) 40 to 90 parts by weight of a copolymer having a glass transition temperature of $-30°$ C. or lower and obtained from (a) 80 to 97% by mole of one or more monomers selected from the group consisting of alkyl acrylates, alkyl methacrylates, vinyl acetate, acrylonitrile, styrene and polymerizable derivaties thereof, and (b) 3 to 20% by mole of one or more monomers having at least one group selected from the group consisting of a carboxyl group, an alcoholic hydroxyl group and a glycidyl group and having an ethylenically unsaturated group.

(ii) a crosslinking agent having at least two crosslinkable functional groups which can react with a carboxyl group, an alcoholic hydroxyl group or a glycidyl group in an amount of 0.1 to 2.0 equivalent weight in terms of the crosslinkable functional groups per equivalent weight of the carboxyl group, the alcoholic hydroxyl group or the glycidyl group of the monomer (b) mentioned above, (iii) 10 to 40% parts by weight of one or more liquid addition polymerizable materials having a boiling point of 200° C. or higher under atmospheric pressure and having a radical polymerizable unsaturated group, (iv) 1 to 10 parts by weight of one or more liquid addition polymerizable materials having a boiling point of 200° C. or higher under atmospheric pressure and having at least two radical polymerizable unsaturated groups, and (v) 1 to 15 parts by weight of a photochemical initiator and/or a photochemical initiator system which generates free radicals by actinic light, and irradiating said composition with actinic light.

DETAILED DESCRIPTION OF THE INVENTION

The term "adhesive film" includes pressure-sensitive adhesive film or tape.

The monomers (a) for giving the copolymer (i) include alkyl acrylates, alkyl methacrylates, vinyl acetate, acrylonitrile, vinyl toluene, styrene and polymerizable derivatives thereof. Examples of alkyl acrylates and alkyl methacrylates are methyl acrylate, methyl methacrylate, ethyl acrylate, ethyl methacrylate, butyl acrylate, butyl methacrylate, isobutyl acrylate, isobutyl methacrylate, octadecyl acrylate, octadecyl methacrylate, 2-ethylhexyl acrylate, 2-ethylhexyl methacrylate, and the like. Polymerizable derivatives of these monomers include alkyl acrylate halides and alkyl methacrylate halides for example, 2,2,2-tribromoethyl acrylate, 2,2,2-tribromoethyl methacrylate, 2,2,2-trifluoroethyl acrylate, 2,2,2-trifluoroethyl methacrylate and the like.

The monomers (b) for giving the copolymer (i) having at least one group selected from the group consisting of a carboxyl group, an alcoholic hydroxyl group and a glycidyl group and having an ethylenically unsaturated group include acrylic acid, methacrylic acid, maleic acid, cinnamic acid, crotonic acid, sorbic acid, etc., β-hydroxyethyl acrylate, β-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, etc.

In the production of the copolymer (i), the monomer (b) is used in an amount of 3 to 20% by mole to give good results. If the amount is less than 3% by mole, cohesion strength is insufficient due to insufficient crosslinking, while if the amount is more than 20% by mole, adhesiveness is damaged due to excessive crosslinking density. Thus the amount of the monomer (a) is within the range of 80 to 97% by mole. The glass transition temperature ($T_g$) of the copolymer (i) is an important factor for maintaining adhesiveness after irradiation with actinic light and it should be $-30°$ C. or lower.

The molecular weight of the copolymer (i) is usually about 200,000 to 500,000, but it can be as low as about 10,000 without losing physical properties of the adhesive material. It is assumed that migration which is generated by lowering the molecular weight according to conventional processes can be prevented by crosslinking owing to polymerization of the addition polymerizable materials. That the molecular weight of the copolymer (i) can be lowered as mentioned above gives another advantage that coating processability is good due to a low viscosity at the time of coating. The amount of the copolymer (i) is 40 to 90 parts by weight, preferably 50 to 80 parts by weight, based on the total non-volatile components in the composition.

The crosslinking agent (ii) is a compound having at least two functional groups which can react with the functional group, i.e. the carboxyl group, the alcoholic hydroxyl group or the glycidyl group, contained in the copolymer (i). When the functional group contained in the copolymer (i) is a carboxyl group, there can preferably be used as the crosslinking agent (ii) polyisocyanates, alkyl etherified melamines, alkyl etherified urea resins or polyhydric alcohols. When the functional group contained in the copolymer (i) is an alcoholic hydroxyl group, there can preferably be used as the crosslinking agent (ii) the compounds as mentioned above and acid anhydrides. When the functional group contained in the copolymer (i) is a glycidyl group, there can preferably be used as the crosslinking agent (ii) carboxylic group anhydrides and compounds having at least two amino groups such as polyamines.

Examples of polyisocyanates are tolylene diisocyanate, diphenylmethane diisocyanate, 2,2,4-trimethylhexamethylene diisocyanate, a reaction product of 3 moles of tolylene diisocyanate and 1 mole of trimethylolpropane, ditri-isocyanate compounds such as p-isocyan triphenylmethane, and derivatives thereof.

Examples of alkyl etherified melamines are ethyl etherified melamine, propyl etherified melamine, butyl etherified melamine, etc.

Examples of alkyl etherified urea resins are ethyl etherified urea resin, propyl etherified urea resin, butyl etherified urea resin, etc.

Examples of carboxylic acid anhydrides are phthalic anhydride, pyromellitic anhydride, hexahydrophthalic anhydride, etc.

Examples of polyhydric alcohols are glycerin, trimethylolpropane, 1,4-hexane diol, neophentyl glycol, propylene glycol, etc.

Examples of polyamines are ethylenediamine, sulfamine, diethylenetriamine, meta-phenylenediamine, tris(-dimethylaminomethyl)phenol, etc.

The amount of the crosslinking agent (ii) is 0.1 to 2.0 equivalent weight in terms of the crosslinkable functional groups of the crosslinking agent per equivalent weight of either the carboxyl group, the alcoholic hydroxyl group or the glycidyl group. If the amount is more than 2 equivalent weight, excessive crosslinking agent which does not pertain to the crosslinking reaction unpreferably brings about transfer bonding and migration to an adherend, while if the amount is less than 0.1 equivalent weight, cohesion strength is insufficient due to insufficient crosslinking, which also unpreferably bring about transfer bonding and migration to an adherend. Further, when the molecular weight of the copolymer (i) is lowered in order to reduce the amount of the solvent to be used, there remarkably appears migration or transfer bonding.

The composition used in this invention contains liquid addition polymerizable materials having a boiling point of 200° C. or higher under atmospheric pressure. Said liquid addition polymerizable materials have mainly two roles. One of them is to lower the viscosity of the adhesive composition at the time of coating, and another of them is to increase internal cohesion strength of the whole system by forming three dimensional structure by the polymerization of addition polymerizable groups of the addition polymerizable materials with actinic light irradiation after coating. In other words, the liquid addition polymerizable materials are contained in the composition as reactive diluent. As the liquid addition polymerizable materials, it is necessary to use in combination with at least one liquid addition polymerizable material (iii) having one radical polymerizable unsaturated group, i.e. monofunctional monomer, and at least one liquid addition polymerizable material (iv) having two or more radical polymerizable unsaturated groups, i.e. polyfunctional monomer. By the combination of the monofunctional monomer and the polyfunctional monomer, a defect of monofunctional monomer, i.e. low in photo-reactivity, and a defect of polyfunctional monomer, i.e. insufficient in flexibility, can be compensated mutually. It is preferable for the liquid addition polymerizable materials to have groups which can react with the crosslinking agent from the viewpoint of improving cohesion strength.

Examples of the liquid addition polymerizable material (iii) having a boiling point of 200° or higher under atmospheric pressure and one radical polymerizable unsaturated group are 2-ethylhexyl methacrylate, 2-ethylhexyl acrylate, lauryl methacrylate, lauryl acrylate, tridecyl methacrylate, tridecyl acrylate, stearyl methacrylate, stearyl acrylate, polypropylene glycol monomethylacrylate, polyethylene glycol monomethacrylate, polyethylene glycol monoacrylate, methoxypolyethylene glycol methacrylate, 2-hydroxydodecyl methacrylate, 2-hydroxydodecyl acrylate, ARONIX M-5500 (trade name, monoacrylate of polyester, manufactured by Toagesei Chemical Industry Co., Ltd.), ARONIX M-5700 (trade name, monomethyacrylate of polyester, manufactured by Toagosei Chemical Industry Co., Ltd.), etc.

The amount of the monofunctional monomer (iii) is 10 to 40 parts by weight, preferably 15 to 30 parts by weight, based on the total non-volatile components in the composition.

Examples of the liquid addition polymerizable materials (iv) having a boiling point of 200° C. or higher under atmospheric pressure and at least two radical polymerizable unsaturated groups are 1,6-hexanediol diacrylate, polyethylene glycol diacrylate, polyethylene glycol dimethacrylate, trimethylolpropane triacrylate, trimethylolpropane trimethacrylate, tetramethylolmethane triacrylate, tetramethylolmethane tetracrylate, 1,3-butylene glycol dimethacrylate, polypropylene glycol dimethacrylate, polypropylene glycol diacrylate, etc.

The amount of the polyfunctional monomer (iv) is 1 to 10 parts by weight, preferably 2 to 7 parts by weight, based on the total non-volatile components in the composition.

As the photochemical initiator and the photochemical initiator system (v), it is preferable to use materials which can be activated by actinic light but is not activated thermally below 200° C. and have remarkably low volatility. Examples of such materials are substituted or non-substituted multi-nuclear quinones, e.g. 2-ethylanthraquinone, 2-tert-butylanthraquinone, octamethylanthraquinone, 12,-benzanthraquinone, 2,3-diphenylanthraquinone, etc. Other useful examples are diketone compounds such as diacetyl, bensil, etc., ketone compounds, α-ketaldonyl alcohols and ethers such as benzoin, pivalone, etc., α-hydrocarbon substituted aromatic acyloins such as α-phenyl-benzoin, α,α-diethoxy acetophenone, etc. These compounds can be used alone or a mixture thereof as a photochemical initiator system. Aromatic ketones such as 4,4'-bisdialkylaminobenzophenone can also be used as the photochemical initiator. There can also be used a combination (this is a photochemical initiator system) of 2,4,5-triarylimidazole dimer and 2-mercaptobenzoquinazole, leuco crystal violet, or tris(4-diethylamino-2-methylphenyl)methane. Further, there can be used materials having no photochemical initiating properties by themselves but when used together with the photochemical initiators as mentioned above. These can be a photochemical initiator system which can show good photochemical initiating properties. Examples of such compounds are tertiary amines such as triethanolamine in combination with benzophenone. The amount of the photochemical initiator and/or photochemical initiator system (v) is 1 to 15 parts by weight, preferably 3 to 10 parts by weight, based on the total non-volatile components in the composition.

The adhesive composition may further contain one or more catalysts for accelerating the crosslinking reaction, colorants such as dyes and pigments, plasticizers, adhesiveness imparting agents, and the like additives.

The adhesive composition is coated on a film-like substrate by a conventional coating method. As the filmlike substrate, there can be used any substrates which are not damaged by the adhesive composition, for example, polyvinyl chloride film, acetate film, polyester film, polyethylene film, polypropylene film, aluminum foil, synthetic paper, and the like.

For coating the adhesive composition on the filmlike substrate, there can be used a roll coater, a knife coater, a kiss coater, a gravure coater, and the like.

When a solvent is contained in the adhesive composition so as to lower a viscosity of the composition or a solvent used at the time of synthesis of the polymer is retained, it is removed by drying after coating and then irradiation with actinic light is conducted. When a very small amount of solvent is contained in the composition and can be removed at the time of actinic light irradiation or no solvent is contained in the composition, the step of irradiation of actinic light is conducted without via a drying step.

As the actinic light, obtained from conventional actinic light sources such as carbon-arc lamps, mercury-vapor lamps, xenon lamps, and the like can be used. Since the initiator and/or initiator system (v) have maximum ability of polymerization initiation in the ultraviolet region, it is preferable to use a light source which can irradiate light effectively in the ultraviolet region. When the photochemical initiator and/or photochemical initiator system (v) are sensitive to visible light, for example in the case of 9,10-phenanthrenequinone, and the like, visible light can be used as actinic light, e.g. the light sources mentioned above as well as flashlamps for photographs, sunlamps, and the like.

Irradiation of actinic light can be conducted in the air or it can be conducted under nitrogen gas, carbon dioxide gas or under vacuum so as to prevent the inhibition of polymerization by oxygen. In the case of irradiation in the air, inhibition of polymerization by oxygen can be disregarded when intensity of actinic light is increased.

The filmlike substrate on which the adhesive agent layer has been formed is usually wound up on a roll and aged at normal temperatures for 3 to 4 days to complete crosslinking by the crosslinking agent and to put to practical use. The aging period can be shortened by heating.

This invention is illustrated by way of the following Examples, in which all parts and percents are by weight unless otherwise specified.

EXAMPLE 1

A mixture of 104 parts of distilled water, 0.4 part of a surface active agent (MONOGEN Y-100, trademark, manufactured by Dai-Ichi Kogyo Seiyaku Co., Ltd.), 88.5 parts of butyl acrylate, 6.5 parts of acrylonitrile and 5 parts of 2-hydroxyethyl methacrylate (4.5% by mole among the total monomers) was placed in a four-necked flask equipped with a stirrer and the temperature was raised to 30° C. with stirring while introducing nitrogen gas. Subsequently, 0.25 part of potassium persulfate, 0.08 part of sodium bisulfate and 0.5 part of sodium lauryl sulfate were added to the flask. Polymerization proceeded rapidly and a copolymer having a glass transition temperature of −44° C. and a number average molecular weight of about 300,000 was obtained. The copolymer was recovered from the emulsion, dried and dissolved in toluene to give a 15% toluene solution.

Using the thus obtained copolymer solution A, adhesive compositions A and B were prepared as follows. The adhesive composition A is an example of a conventional composition and is prepared for comparison. The adhesive composition B is an example of this invention.

| Adhesive composition A | |
|---|---|
| Copolymer solution A | 100 parts |
| CORONATE L*[1] | 1 part |
| | (about 0.28 equivalent) |
| Adhesive composition B | |
| Copolymer solution A | 100 parts |
| Polypropylene glycol monomethacrylate (BLENMER PP-1000, trademark, manuf. by Nippon Oil & Fats Co., Ltd.) | 35 parts |
| Trimethylolpropane triacrylate | 5 parts |
| CORONATE L | 2 parts |
| | (about 0.23 equivalent) |
| Benzophenone | 8 parts |
| Michler's ketone | 1 part |

*[1]A 75% ethyl acetate solution of a reaction product of 1 mole of trimethylolpropane and 3 moles of tolylene diisocyanate, trade name, manufactured by Japan Polyurethane Co., Ltd.

The adhesive composition B was prepared as follows. After formulating 330 parts of the copolymer solution A, 35 parts of polypropylene glycol monomethacrylate, 5 parts of trimethylolpropane triacrylate, 2.7 parts of CORONATE L, 8 parts of benzophenone, and 1 part of Michler's ketone, toluene was removed by using a solvent removing apparatus under reduced pressure (Evaporator N type, manufactured by Tokyo Rika Kikai K.K) and recovered.

The adhesive composition A had a viscosity of about 7500 cps/20° C. and the adhesive composition B had a viscosity of about 9000 cps/20° C., but the solvent content of the adhesive composition A was about 85% and that of the adhesive composition B was about 33%.

The adhesive composition A was coated on polyester film of 30μ thick by using a reverse-roll coater so as to make the coating about 10μ thick according to a conventional method and dried at 100° C. for 2 minutes by blowing hot air to remove the solvent. After winding up the resulting film on a roll, it was stored for 5 days to give adhesive film.

The adhesive composition B was coated on polyester film of 30μ thick by using a reverse-roll coater so as to make the coating about 10μ thick and dried at 100° for 1 minute by blowing hot air to remove the solvent. Subsequently, the adhesive composition coated film was irradiated with ultraviolet light for 10 seconds at a distance of 15 cm from a 2 kW ultrahigh pressure mercury lamp (Jet Light-2000, manufactured by ORC Seisakusho, Ltd.) and wound up on a roll to store for 5 days at normal temperatures and to give adhesive film.

Physical properties of the resulting adhesive films are as shown in Table 1.

TABLE 1

| Physical properties | Adhesive film obtained from adhesive composition A | Adhesive film obtained from adhesive composition B |
|---|---|---|
| Adhesive strength *[2] | 120–140 | 80–110 |
| Change of adhesive strength with the lapse of time *[3] | 270% increase | 140% increase |
| Weather resistance*[4] | 100 hours | 200 hours |

(Note)
*[2]An adhesive film was applied to a stainless steel plate and peeled after 30 minutes with a peel speed 200 mm/min, and peel angle 90° to measure adhesive strength. Unit: g/25 mm wide.
*[3]An adhesive film was applied to a stainless steel plate and subjected to the accelerating test with heating at 65° C. for 7 days and increase of adhesive strength was expressed by percents (smaller increase, better result).
*[4]Time required for generating transfer bonding or migration of an adhesive material to the adherend in the sunshine weatherometer test (atmosphere, 45° C./50% humidity; block panel temperature, 63° C.; shower, 12 minutes in 60 minutes)

As shown in Table 1, the adhesive film obtained by the process of this invention has physical properties not so different from those of the conventional adhesive film and can sufficiently be used as adhesive film. (The data of the adhesive film obtained from adhesive composition A in Table 1 are equivalent to ordinary physical properties of generally used ones.)

As to the content of solvent, the adhesive composition A contains the solvent in an amount of about 85%, while the adhesive composition B contains the solvent in an amount of about 33%, the latter being about 1/2.6 of the former. Further, in practical use, when the same amounts of non-volatile adhesive agents are coated, the amount of solvent to be removed in the case of this invention becomes about 1/11.4 of the conventional case.

EXAMPLE 2

In an four-necked flask equipped with a stirrer, 10 parts of toluene was placed and the temperature was raised to 100° C. Subsequently, a uniform mixture of 50 parts of butyl acrylate, 40 parts of 2-ethylhexyl acrylate, 10 parts of 2-hydroxyethyl acrylate (12.6% by mole among the total monomers), 0.05 part of n-dodecyl mercaptan, and 2 parts of azobisisobutyronitrile was added dropwise in 8 hours while controlling the temperature and the reaction was continued for additional 5 hours to give a copolymer. The reaction was conducted while introducing nitrogen gas into the flask. The resulting copolymer solution B had a copolymer content of 91.4%, and a viscosity of 260 poises (B type rotating viscometer, 25° C.). The copolymer had a number average molecular weight of about 45,000 and a glass transition temperature of about −44° C.

In the next place, the adhesive composition C was prepared as follows:

| Adhesive composition C | |
|---|---|
| Copolymer solution B | 9.4 parts |
| ARONIX M-5700*[5] | 4.0 parts |
| 1,6-Hexanediol diacrylate | 0.5 part |
| CORONATE L*[6] | 1.1 parts |
| | (about 0.542 equivalent) |
| Benzophenone | 0.8 part |
| Michler's ketone | 0.1 part |
| Toluene | 1.0 part |

*[5]Monofunctional monomer, polyester methacrylate, trade name, manufactured by Toagosei Chemical Industry Co., Ltd.
*[6]A 75% ethyl acetate solution of a reaction product of 1 mole of trimethylolpropane and 3 moles of tolylene diisocyanate.

The solvent content of the adhesive composition C was 12.3% and the viscosity of it was 90 poises (25° C., B type rotating viscometer).

Then, the adhesive composition C was coated on polyester film of 30μ thick by using a reverse-roll coater so as to make the coating about 10μ and irradiated with ultraviolet light for 10 seconds at a distance of 15 cm from a 2 kW ultrahigh pressure mercury lamp (Jet Light-2000, manufactured by ORC Seisakusho, Ltd.) to remove the solvent contained in the composition and to carry out photochemical reaction of the addition polymerizable materials. The resulting film was wound up on a roll and stored for 5 days at normal temperature.

The thus produced adhesive film had adhesive strength of 170 g/25 mm wide (measuring conditions: peel speed 200 mm/min, peel angle 90°, temperature of 20° C., after applied to a stainless steel plate for 30 minutes), change of adhesive strength with the lapse of time of within 150% increase (after applied to a stainless steel plate and stored at 65° C. for 7 days) (in conventional case, changing amount being about 300%), and weather resistance of over 200 hours (i.e. no migration nor transfer bonding of the adhesive material to the adherend (stainless steel plate) took place after 200 hours in the sunshine weatherometer test under the conditions of atmosphere 43° C./50% humidity, black panel temperature 63° C. and 12 minutes' shower in 60 minutes). That is, the resulting adhesive film has sufficient physical properties as adhesive film.

Since the adhesive composition C contains the solvent in an amount of 12.3%, the solvent content is about 1/6–1/7 of the conventional solvent content, conventional adhesive compositions containing solvents in an amount of about 70 to 90%. This means that, in practical use, when the same amounts of non-volatile adhesives are coated, the amount of solvent to be removed in the case of this invention becomes about 1/24 to 1/64 of the conventional case. This is a very advantageous thing.

As explained in detail in the working examples, the process for producing adhesive films by irradiation of actinic light according to this invention has advantages in that the amount of solvent to be removed after coating by drying or the like step can be reduced remarkably compared with the conventional methods, there takes place no deterioration in physical properties caused by the reduction of the amount of solvent to be used unlike the conventional case, and adhesive films having good physical properties can be produced industrially.

The above-mentioned examples are only a few examples for producing adhesive film by actinic light irradiation according to this invention, and various modifications and changes to the process of this invention are possible within the gist of this invention.

What is claimed is:

1. A process for producing adhesive film which comprises coating on a filmlike substrate a composition comprising
   (i) 40 to 90 parts by weight of a copolymer having a glass transition temperature of −30° C. or lower and obtained from
      (a) 80 to 97% by mole of one or more monomers selected from the group consisting of alkyl acrylates, alkyl methacrylates, vinyl acetate, acrylonitrile, styrene and polymerizable derivatives thereof, and
      (b) 3 to 20% by mole of one or more monomers having at least one group selected from the group consisting of a carboxyl group, an alcoholic hydroxyl group and a glycidyl group and having an ethylenically unsaturated group,
   (ii) a crosslinking agent having at least two crosslinkable functional groups which can react with a carboxyl group, an alcoholic hydroxyl group or a glycidyl group in an amount of 0.1 to 2.0 equivalent weight in terms of the crosslinkable functional groups per equivalent weight of the carboxyl group, the alcoholic hydroxyl group or the glycidyl group of the monomer (b) mentioned above,
   (iii) 10 to 40 parts by weight of one or more liquid addition polymerizable materials having a boiling point of 200° C. or higher under atmospheric pressure and having a radical polymerizable unsaturated group,
   (iv) 1 to 10 parts by weight of one or more liquid addition polymerizable materials having a boiling point of 200° C. or higher under atmospheric pressure and having at least two radical polymerizable unsaturated groups, and
   (v) 1 to 15 parts by weight of a photochemical initiator and/or a photochemical initiator system which generates free radicals by actinic light, and irradiating said composition with actinic light.

2. A process according to claim 1, wherein the monomer (b) is a compound having at least one carboxyl group and an ethylenically unsaturated group and the crosslinking agent (ii) is one member selected from the group consisting of polyhydric alcohols, polyisocyanate compounds, alkyl etherified melamines, and alkyl etherified urea resins.

3. A process according to claim 1, wherein the monomer (b) is a compound having at least one alcoholic hydroxyl group and an ethylenically unsaturated group and the crosslinking agent (ii) is one member selected from the group consisting of polyhydric alcohols, polyisocyanate compounds, alkyl etherified melamines, alkyl etherified urea resins and carboxylic acid anhydrides.

4. A process according to claim 1, wherein the monomer (b) is a compound having at least one glycidyl group and an ethylenically unsaturated group and the crosslinking agent (ii) is one member selected from the group consisting of carboxylic acid anhydrides and compounds having at least two amino groups.

5. A process according to claim 1 or 3, wherein the monomer (b) is β-hydroxyethyl acrylate or β-hydroxyethyl methacrylate.

6. A process according to claim 1, 2 or 3, wherein the crosslinking agent (ii) is a triisocyanate obtained by the addition reaction of 1 mole of trimethylolpropane and 3 moles of tolylene diisocyanate.

7. An adhesive film produced by coating an adhesive composition on a filmlike substrate and irradiating said adhesive composition with actinic light, characterized in that said adhesive composition comprising
   (i) 40 to 90 parts by weight of a copolymer having a glass transition temperature of −30° C. or lower and obtained from
      (a) 80 to 97% by mole of one or more monomers selected from the group consisting of alkyl acrylates, alkyl methacrylates, vinyl acetate, acrylonitrile, styrene and polymerizable derivatives thereof, and (b) 3 to 20% by mole of one or more monomers having at least one group selected from the group consisting of a carboxyl group, an alcoholic hydroxyl group and a glycidyl group and having an ethylenically unsaturated group, (ii) a crosslinking agent having at least two crosslinkable functional groups which can react with a carboxyl group, an alcoholic hydroxyl group or a glycidyl group in an amount of 0.1 to 2.0 equivalent weight in terms of the crosslinkable functional groups per equivalent weight of the carboxyl group, the alcoholic hydroxyl group or the glycidyl group of the monomer (b) mentioned above, (iii) 10 to 40 parts by weight of one or more liquid addition polymerizable materials having a boiling point of 200° C. or higher under atmospheric pressure and having a radical polymerizable unsaturated group, (iv) 1 to 10 parts by weight of one or more liquid addition polymerizable materials having a boiling point of 200° C. or higher under atmospheric pressure and having at least two radical polymerizable unsaturated groups, and (v) 1 to 15 parts by weight of a photochemical initiator and/or a photochemical initiator system which generates free radicals by actinic light.

* * * * *

UNITED STATES PATENT AND TRADEMARK OFFICE
CERTIFICATE OF CORRECTION

PATENT NO. : 4,312,916
DATE : January 26, 1982
INVENTOR(S) : H. KAKUMARU, et al

It is certified that error appears in the above—identified patent and that said Letters Patent is hereby corrected as shown below:

On the Title Page, left-hand column:

"[30] FOREIGN APPLICATION PRIORITY DATA
    Sep. 11, 1979 [JP]   Japan ............54-11694"

should read:

--[30] FOREIGN APPLICATION PRIORITY DATA
    Sep. 11, 1979 [JP]   Japan ...........54-116941--

Signed and Sealed this

Third Day of August 1982

[SEAL]

Attest:

GERALD J. MOSSINGHOFF

Attesting Officer     Commissioner of Patents and Trademarks